United States Patent [19]

Sekiya et al.

[11] Patent Number: 5,150,597
[45] Date of Patent: Sep. 29, 1992

[54] HOT STRIP PLANT

[75] Inventors: Teruo Sekiya, Takahagi; Tomoaki Kimura, Hitachi; Sadao Nishimura, Funabashi, all of Japan

[73] Assignee: Hitachi, Ltd., Tokyo, Japan

[21] Appl. No.: 698,390

[22] Filed: May 10, 1991

[30] Foreign Application Priority Data

Jun. 12, 1990 [JP] Japan .................. 2-152991

[51] Int. Cl.$^5$ .............................. B21B 1/34
[52] U.S. Cl. ............................ 72/229; 72/234; 29/527.7
[58] Field of Search .......... 72/202, 229, 226, 227, 72/231, 234; 29/527.7; 164/476

[56] References Cited

U.S. PATENT DOCUMENTS

| | | | |
|---|---|---|---|
| 4,311,030 | 1/1982 | Kitashima et al. | 72/247 |
| 4,319,474 | 3/1982 | Gronbech | 72/229 |
| 4,348,882 | 9/1982 | Tippins | 72/229 |
| 4,433,566 | 2/1984 | Tippins et al. | 72/229 |
| 4,497,191 | 2/1985 | Langer et al. | 72/202 |
| 4,503,697 | 3/1985 | Tippins et al. | 72/229 |
| 4,829,656 | 5/1989 | Rohde | 29/527.7 |
| 5,020,208 | 6/1991 | Feldmann et al. | 29/527.7 |

OTHER PUBLICATIONS

Hitachi Review, vol. 37, No. 4, 1988, pp. 181–188, T. Kimura et al., "HC-Mill in Hot Strip Mill Plant-Operational Data and Effect—".

*Primary Examiner*—Lowell A. Larson
*Assistant Examiner*—Thomas C. Schoeffler
*Attorney, Agent, or Firm*—Evenson, Wands, Edwards, Lenahan & McKeown

[57] ABSTRACT

In this invention, a reversing roughing mill and a reversing finishing mill are disposed at such a distance that a material can reach the finishing mill only in the final pass of roughing, can thus prevent damage to and surface deterioration of finishing rolls in the roughing pass, can reduce the heat loss of the material located between the roughing mill and finishing mill and can produce a strip having excellent surface quality.

In the present invention, a continuous casting plant and a hot rolling plant are connected to each other by a furnace having reheating and soaking functions and a heat retaining box for accumulating slabs is disposed adjacent to this furnace. Therefore, even when rolling is stopped due to any trouble with the rolling plant and extraction of the slab from the furnace to the rolling plant cannot be made, the continuous casting plant can continue to cast the slab without stopping its operation and the cast slabs are accumulated in the heat retaining box and the accumulated slabs can be heated by the furnace and can be extracted to the rolling plant before the next pouring by a ladle.

4 Claims, 2 Drawing Sheets

HOT STRIP PLANT

BACKGROUND OF THE INVENTION

This invention relates to a hot strip plant including a reversing roughing mill and a reversing finishing mill and a hot strip production method. More particularly, the present invention relates to a hot strip plant and a production method for producing efficiently a high quality sheet steel using a compact plant.

In a conventional compact hot strip plant including one reversing roughing mill and one reversing finishing mill equipped with a furnace coiler on its entrance and exit sides, the roughing mill and the finishing mill are disposed at a distance such that the material in the final pass of the roughing mill does not reach the finishing mill lest the roughing pass and the finishing pass are carried out simultaneously. Though this arrangement has such features that roughing and finishing can be carried out separately, it poses the following problems. First of all, the conveying distance of the material from the roughing mill to the finishing mill is long. Secondly, since many passes must be conducted in the finishing mill, a large heat loss cannot be avoided even when a furnace coiler is disposed on both entrance and exit sides of the finishing mill and particularly in the case of a thin material, a necessary final rolling temperature cannot be secured. Thirdly, descaling must be stopped in a pass where the thickness of the material is reduced below a predetermined thickness in order to avoid such a heat loss, which results in insufficient scale removal from the material and poor product quality.

To avoid these problems, U.S. Pat. No. 4,497,191 proposes a hot rolling mill of a web-like or sheet-like material. In accordance with this prior art technology, a 2-tandem reversible finishing mill which comprises two finishing mills each having coilers in front and at the back thereof is disposed in the proximity of a reversing roughing mill and selective tandem rolling by the roughing mill and two finishing mills and 2-tandem reversing rolling by two finishing mills are carried out in order to avoid the heat loss that would be caused by the reduction of the distance between the rolling mill and the finishing mills and by the 50% reduction of the number of take-up operations in the finishing mills and thus to obtain a high quality product.

To accomplish highly efficient production in a hot strip plant, it is very important how the system of the plant is interconnected as a whole. In conjuction with this point, a continuous casting plant and a hot rolling plant are connected to each other generally through a reheating furnace or a soaking pit furnace. Recently, direct rolling which rolls continuously a cast slab has been put into practical application and the has succeeded in saving energy. In any of these prior art technologies, however, a slab yard requiring a large space inside the continuous casting plant must be provided, and a rolling plant connected directly to a thin slab (about 50 mm thick) continuous casting machine has been proposed recently as a compact strip plant.

However, the plant disclosed in U.S. Pat. No. 4,497,191 described above involves the following problems. To begin with, since the roughing mill and the finishing mill are disposed adjacent to each other in this prior art technology, the material moves while passing through the roller gap of the finishing mill during a roughing pass and at this time, the surface of the material comes into contact with a sheet guide and rolls of the finishing roller. Therefore, the rolls are damaged due to the contact with the material, an oxide scale falls from the surface of the material and is deposited, this deposited scale is entrapped between the rolls at the time of finishing and causes damage to and surface deterioration of the rolls, and these defects are in turn transferred to the product and lower surface quality. To prevent these problems, the rolls must be ground very frequently and the rate of operation drops.

The fall of the scale in the finishing mill can be prevented by conducting descaling on the entrance side of the finishing mill. According to this method, however, only the portion of the material which enters the finishing mill is descaled and a localized temperature drop occurs at this portion. The temperature drop occurs also in the roughing pass because it is difficult to accomplish heat shield inside the finishing mill.

Furthermore, the finishing mill of this U.S. Pat. No. 4,497,191 employs the system for carrying out reversing rolling by disposing coilers in front and at the back of the two reversing rolling mills. Therefore, when finishing is carried out simultaneously by the two finishing mills, it is not possible to divide the finishing mill into a pre-stage portion and a post-stage portion, for example, so as to separate the material and to provide the material with rolling characteristics suitable for each pass that have been employed conventionally in a continuous hot strip tandem mill comprising six to seven rolling stands. In addition, quality of the product is deteriorated due to surface deterioration in view of the construction of the finishing mill. Furthermore, when reversing finishing is conducted by use of only one of the two finishing mills, productivity drops and at the same time, since the distance to one of the coilers is long, heat loss cannot be avoided.

Since the conventional compact strip plant is not equipped with means for accumulating slabs in addition to its difficulty in producing a thin slab, casting must be stopped when any trouble occurs in the rolling line, or unnecessary semifinished slabs are produced. In this sense, the system configuration is not rational. For these reason, a stable and highly efficient operation is difficult to perform.

SUMMARY OF THE INVENTION

It is an object of the present invention to provide a hot strip plant and production method for producing economically and efficiently a hot strip having good surface properties.

It is another object of the present invention to provide a hot strip plant and production method which insures a stable and highly efficient operation during the production of a hot strip.

In a hot strip plant including a reversing roughing mill and a reversing finishing mill having coiler/uncoilers in front and at the back thereof, the objects of the invention described above can be accomplished by a hot strip plant which is characterized in that the reversing roughing mill and the reversing finishing mill are disposed at such a distance that a material does not reach the reversing finishing mill until the final pass of the roughing mill, and at least one unidirectional finishing mill is disposed on the exit side of the reversing finishing mill.

The unidirectional finishing mill is preferably a 6-High rolling mill. It is also possible to dispose two sets of the unidirectional finishing mills, at least one of which being a 6-High rolling mill having small diameter working rolls.

In the hot strip plant described above, the present invention carries out the final pass of the reversing finishing mill interlockingly with the unidirectional finishing mill.

In a hot strip plant including a continuous casting plant and a hot rolling plant, the present invention connects the continuous casting plant and the hot rolling plant by a furnace having reheating and soaking functions, and disposed a heat retaining box for accumulating slabs adjacent to this furnace.

In the hot strip plant described above, the present invention charges directly the slab cast by the continuous casting plant into the furnace under a normal state so as to carry out heating for soaking, and charges the cast slab into the heat retaining box without stopping the casting operation by the continuous casting plant when any trouble occurs with the hot strip plant.

In the present invention having the construction described above, the reversing roughing mill and the reversing finishing mill are disposed at such a position that the material can reach the finishing mill only in the final pass of roughing. Accordingly, damage to and surface deterioration of the finishing roller in the roughing pass can be prevented and since a heat shield can be disposed easily between the roughing mill and the finishing mill, a heat loss can be reduced and a strip having high surface quality can be produced. Moreover, frequency of the replacing of the rolls of the finishing mill can be reduced. Furthermore, when the material enters the finishing mill, the initial pass of finishing is effected as it is. Accordingly, descaling is carried out throughout the full length of the material and the temperature drop of the material due to descaling becomes uniform throughout its full length and damage to the finishing rollers due to the scale does not occur.

At least one unidirectional finishing mill such as a finishing tandem mill is disposed on the exit side of the reversing finishing mill. Accordingly, the reversing finishing mill and its finishing tandem mill provide a structure approximate to the structure of a conventional finishing tandem mill wherein its pre-stage pass and its post-stage pass are separated, and the diameter and material of a roll can be selected suitably for each pass. This eventually improves surface quality of the material and extends the life of the rollers. In the final stage pass when the material becomes thin, tandem rolling is made by the reversing finishing mill and the finishing tandem mill, so that the heat loss can be reduced and a thinner strip product can be produced.

In this manner, the hot strip having good surface properties can be produced highly efficiently on an economical scale.

Needless to say, a 6-High rolling mill is excellent for the shape control of the material and this control capability can be improved further by combining this mill with the reduction of the diameter of the working rolls. Since the finishing pass is divided into the portion borne by the reversing finishing mill and the portion borne by the finishing tandem mill, a 6-High rolling mill which makes it possible to employ small diameter working rolls can be installed and rolling can be made by a mill having a control capability necessary for rolling of a strip. Therefore, high quality products can be produced by thin rolling.

The continuous casting plant and the hot rolling plant are coupled by the furnace having reheating and soaking functions and the heat retaining box for accumulating the slabs is disposed adjacent to this furnace. Accordingly, even when any trouble occurs with the rolling plant to stop the rolling operation and extraction of the slabs from the furnace to the rolling plant cannot be made, the continuous casting plant casts the slab without stopping its operation, the casted slabs are accumulated in the heat retaining box and the accumulated slabs can be heated by the furnace and extracted to the rolling plant before the next pouring by a ladle. Thus, high efficient operation and saving of energy can be accomplished.

BRIEF DESCRIPTION OF THE DRAWINGS

Further objects, features and advantages of the present invention will become more apparent from the following detailed description of a preferred embodiment shown in the accompanying drawings, wherein.

DESCRIPTION OF THE PREFERRED EMBODIMENTS

Hereinafter, a preferred embodiment of the present invention will be explained with reference to FIGS. 1 and 2.

A hot strip plant in accordance with the present invention employs a continuous casting machine of an ordinary type in order to accomplish a stable operation. Therefore, the thickness of a blank slab is great as in the case of a conventional hot strip mill. Such a thick blank slab is rolled to a thin steel sheet which is about 2 mm thick or in other words, to a strip, from a slab of about 200 mm thick by use of a rolling mill having a small number of stands while the temperature of the material is kept at a high temperature. This can be accomplished by arranging the apparatuses as shown in FIGS. 1 and 2.

Figure 1:
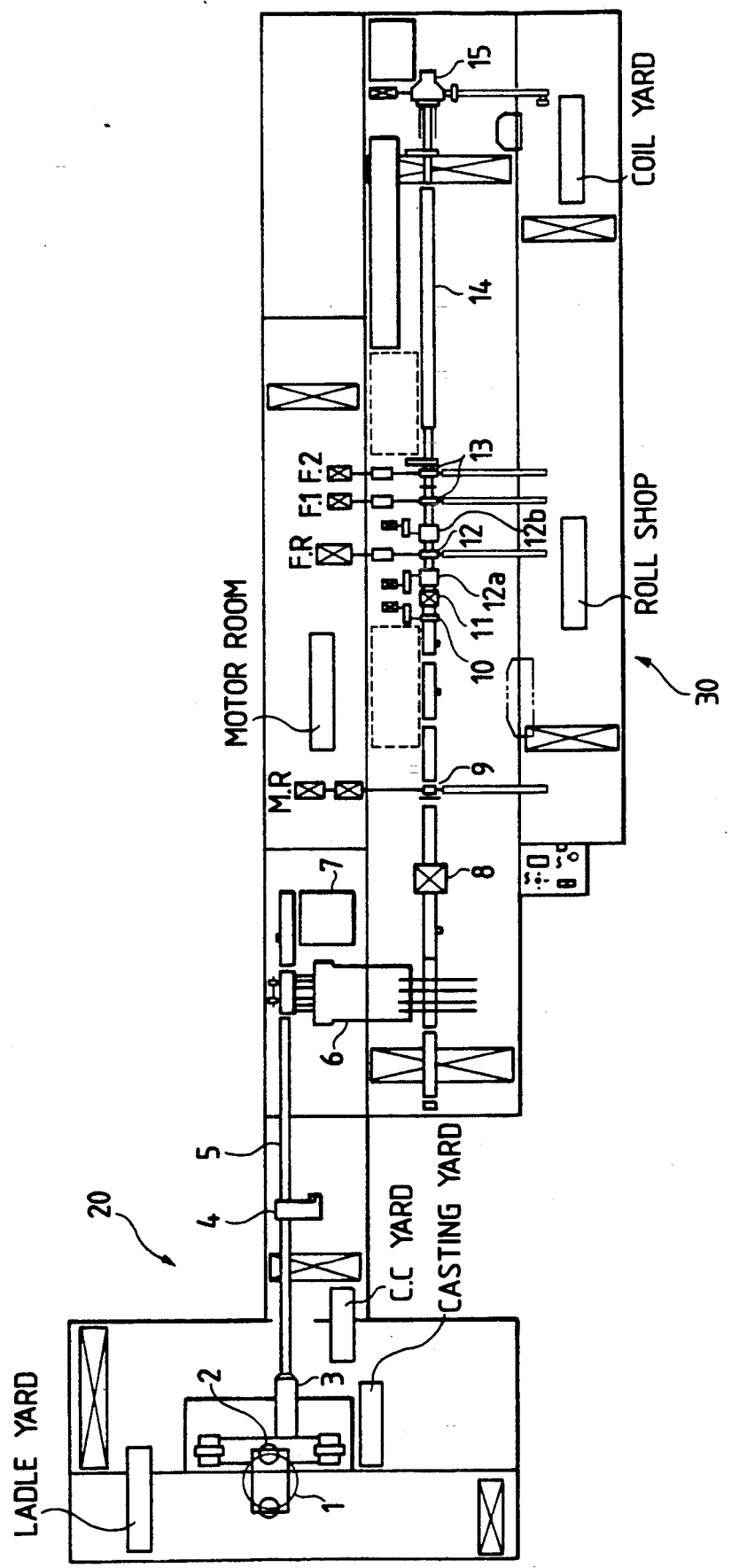
FIG. 1 is a plan view showing the disposition of a hot strip plant in accordance with the present invention.
Figure 2:
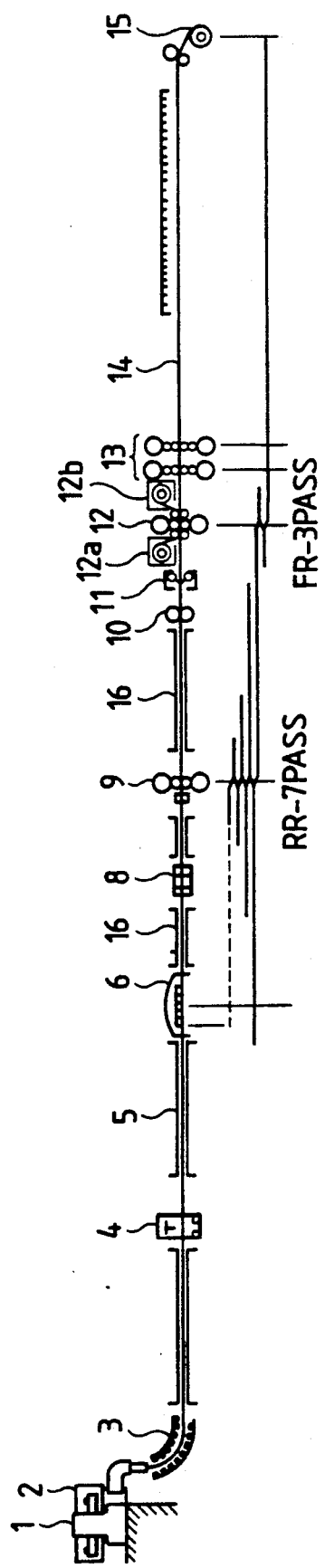
FIG. 2 is an elevational view of the hot strip plant with a rolling pass diagram.

In FIGS. 1 and 2, the hot strip plant of this embodiment includes a continuous casting plant 20 and a hot rolling plant 30 which is disposed unaligned from the casting plant 20 in parallel therewith. These two plants 20 and 30 are connected to each other through a furnace having heating and soaking functions or in other words, through a reheating/soaking pit furnace 6.

The continuous casting plant 20 includes a swing tower 1, a ladle 2, a continuous casting machine 3 and a slab shear 4. Heat retaining tables 5 are disposed between the continuous casting machine 3 and the slab shear 4 and between the slab shear 4 and the reheating/soaking pit furnace 6. The hot rolling plant 30 includes a descaler 8, a reversing roughing mill 9, a crop shear 10, a descaler 11, a reversing roughing mill 12 having furnace coilers 12a, 12b on its entrance and exit sides, a unidirectional finishing tandem mill 13 positioned on the exit side of the mill 12, a hot run table 14 and a down coiler 15. Heat retaining tables 16 are disposed between the reheating/soaking pit furnace 6 and the descaler 8, between the descaler 8 and the roughing mill 9 and between the roughing mill 9 and the crop shear 10, respectively. A heat retaining box 7 is disposed adjacent to, and downstream of, the reheating/soaking pit furnace 6 in order to accumulate the slabs, and various means for charging, widthdrawing and conveying the slabs into and from these reheating/soaking pit furnace 6 and heat retaining box 7 are disposed.

In the hot rolling plant 30, the reversing roughing mill 9 is disposed in the proximity of the reversing finishing mill 12 at such a distance that the material does not reach the reversing finishing mill 12 reaches the finishing mill 12 in the final pass of the roughing mill 9. The finishing tandem mill 13 disposed on the exit side of the reversing finishing mill 12 consists of two 6-High rolling mills. These 6-High rolling mills are combined with the reduction of the diameter of a working roll, whenever necessary.

The outline of the stip production operation in the compact hot strip plant of this embodiment having the construction and arrangement described above is as follows. A molten steel is supplied by the ladle 2 into the continuous casting machine 3 to produce a slab. This slab is soaked by the furnace 6. Roughing and finishing of this soaked slab are carried out in the hot rolling plant 30 as will be described later and the strip is produced. The strip after rolling is cooled to a predetermined temperature by the hot run table 14 and is taken up into a coil by the coiler 15.

In the hot rolling plant 30, roughing of the materials such as a slab having a thickness of about 200 mm to a bar material having a thickness of about 25 mm, for example, is carried out by one reversing roughing mill 9 through the repetition of several passes. Due to the relation of arrangement between the reversing roughing mill 9 and the reversing finishing mill 12 described above, the final pass of the reversing roughing mill 9 is carried out in the interlocking arrangement with the initial pass of the reversing finishing mill 12 while the material is being taken up by the furnace coiler 12b on the exit side of the finishing mill 12. In this manner the plant can be made compact and the heat radiation quantity from the material can be reduced. When the material enters the finishing mill 12, descaling is effected by the descaler 11 throughout the full length of the material and the temperature drop of the material due to this descaling becomes uniform throughout its entire length and damage to the finished roll due to descaling does not occur.

Finishing is carried out by the reversing finishing mill 12 and the finishing tandem mill 13. In other words, while the material is thick and its length is small, rolling is carried out generally in three passes of normal—reverse—normal passes in this order by the reversing finishing mill 12. Since these rolling operations are carried out while the material is being taken up by the furnace coilers 12a, 12b heated to a high temperature, the temperature drop of the material can be prevented. The final pass of this reversing finishing mill 12 is carried out simultaneously and in the interlocking arrangement with two 6-High rolling mills of the finishing tandem mill 13. Incidentally, the number of mills of the finishing tandem mills 13 need not always be two but may be one or at least three.

The rolling process described above will be explained using the numeric values on an actual pass schedule. A slab which is 200 mm thick and 9.6 m long is rolled to a bar having a thickness of about 25 mm by seven passes of repeated roughing. The bar is about 77 m long after these seven passes. The bar in a pass, which is 3 passes ahead of the final seventh pass, that is, in the fifth pass, is 65 mm thick and about 30 m long. The final seventh pass of roughing and the initial pass of the reversing finishing mill 12 are carried out in the interlocking arrangement with each other and finishing of three passes in the reversing finishing mill 12 and two passes in the finishing tandem mill 13 or in other words, five passes in total, is carried out. Finally, a strip product which is 2 mm thick and 960 m long is obtained through the twelve passes in total. Incidentally, this rolling pass is represented by a diagram at the lower part of FIG. 2.

The distance between the roughing mill 9 and the finishing mill 12 in this pass schedule is about 40 m to about 50 m which is the bar length 30 m in the pass which is three passes ahead of the final roughing pass, that is, in the fifth pass, plus a margin. In other words, when the length of the material in the final pass of the reversing roughing mill 9 is $L_{RMAX}$, the reversing roughing mill 9 is disposed at a distance L from the finishing mill 12 which satisfies the following relation:

$$L_{RMAX}/2 < L < L_{RMAX}$$

As described above, rolling is made in the hot rolling plant 30 from the slab thickness of 200 mm to the product thickness of 2 mm, for example, and in this instance, a product having a unit coil weight of 15 kg/mm and a coil length of 960 m can be obtained in twelve passes of roughing and finishing passes. Moreover, final pass rolling can be carried out at a temperature above a predetermined temperature such as 840° C. or above. Such a rolling operation has been carried out conventionally by a large scale rolling plant which comprises one to three roughing mills and six to seven finishing mills and which extends some hundreds of meters. In contrast, in accordance with this embodiment, the total number of roughing and finishing mills is as small as four and the distance from the reheating/soaking pit furnace 6 to the coiler 12 is about 200 m and the scale of the plant can be reduced to ⅓ to ½ of the conventional plant.

In this embodiment, the continuous casting plant 20 and the hot rolling plant 30 are disposed in parallel with each other and are coupled by the reheating/soaking pit furnace 6 as already described. During the stable operation, only the soaking of the slab is carried out generally by this furnace 6 and the slab is supplied to the rolling plant. Incidentally, the continuous casting plant 20 and the hot rolling plant 30 conduct mutually different operations and troubles of the plants themselves or operation troubles are likely to occur in these plants. When any trouble occurs in the hot rolling plant 30, the operation of the continuous casting plant 20 is not stopped and casting is carried out for at least the molten steel that has been prepared. The slab produced in this case is retained temporarily in the heat retaining box 7 and when the rolling plant starts operating once again, the slab is heated again by the reheating/soaking pit furnace 6 and is then supplied to the rolling plant 30.

Since the reheating/soaking pit furnace 6 and the heat retaining box 7 are diposed as described above, the loss that occurs at the time of troubles of the plants and operations can be minimized.

The embodiment having the construction as described above provides the following effects. Since the reversing roughing mill 9 is disposed at such a distance that the material can reach the finishing mill 12 only from the final pass of roughing, damage to and skin deterioration of the finishing rolls in the roughing pass can be prevented. Since the heat shield or the heat retaining table 16 can be disposed between the roughing mill 9 and the finishing mill 12, the heat loss can be minimized and a strip having high surface quality can be produced. The frequency of roll replacement in the finishing mill 12 can be reduced. Furthermore, when the material enters the finishing mill 12, the initial pass of finishing is carried out as it is, so that descaling can be carried out throughout the full length of the material, the temperature drop of the material due to descaling becomes uniform throughout its full length and damage to the finishing roll due to scale does not occur.

The finishing tandem mill 13 is disposed on the outlet side of the reversing finishing mill 12. Accordingly, the reversing finishing mill 12 and the finishing tandem mill 13 have a structure which is approximate to the conventional structure wherein the pre-stage passes and post-stage passes of the finishing tandem mill are separated, and the roll diameter, the material, and the like, can be selected so as to be suitable for each pass. This improves the surface quality of the product and extends the life of the roll. In the final pass where the material becomes thin, the heat loss can be reduced by employing tandem rolling by the reversing finishing mill 12 and the finishing tandem mill 13, and a thinner hot-rolled product can thus be produced.

The 6-High rolling mill is excellent for the purpose of the shape control of the material and the control capability can be further improved by using the 6-High rolling mill for the finishing tandem mill 13 and combining it with the reduction of the diameter of a working roll. Since the finishing pass is divided into the pass borne by the reversing finishing mill 12 and the pass borne by the finishing tandem mill 13, the installation of the 6-High rolling mill which can employ a working roll having a small diameter becomes possible and rolling can be made by a mill having a control capability necessary for rolling thin products. Accordingly, a high quality product can be produced by thin sheet rolling.

Furthermore, the continuous casting plant 20 and the hot rolling plant 30 are coupled by the furnace 6 having the reheating and soaking functions, and the heat retaining box 7 for accumulating the slab is disposed adjacent to this furnace 6. Accordingly, the continuous casting plant 20 can produce the slab without stopping its operation even when the rolling operation is stopped due to the trouble with the rolling plant and the slab cannot be extracted from the furnace 6 to the rolling plant 30. In this case, the cast slab is accumulated in the heat retaining box 7 and this accumulated slab is heated by the furnace and can be extracted to the rolling plant before the next pouring operation by the ladle 2. In this manner, the operation can be carried out highly efficiently and energy can be saved drastically.

Incidentally, in the embodiment described above, the effects brought forth by the reheating/soaking pit furnace 6 and the heat retaining box 7 can be obtained also even when the tandem rolling mill is not disposed on the outlet side of the reversing finishing mill 12.

The present invention provides the following effects.

1. The present invention can eliminate damage to and surface deterioration of the finishing roll due to the influences of the roughing pass and can reduce the heat loss in the roughing pass. Therefore, the invention can produce a product having high surface quality.

2. The features of rolls for finishing can be selectively used in accordance with each pass and the life of the rolls can be prolonged by tandem rolling in at least three final passes. Therefore, the invention can produce a thin product having high quality.

3. A mill having a high control capability can be disposed for finishing; hence, a thin product having a good profile and shape can be produced.

4. Since the casting plant and the rolling plant can be operated independent of each other, a stable operation can be carried out.

Due to the effects described above, the present invention can provide a small-scale hot strip plant which can produce economically even a thin product having high quality at a low initial cost, and can accomplish a stable operation.

While preferred embodiments along with variations and modifications have been set forth for disclosing the best mode and important details, further embodiments, variations and modifications are contemplated according to the broader aspects of the present invention, all as set forth in the spirit and scope of the following claims.

What is claimed is:

1. A hot strip plant, comprising:
   a reversing roughing mill; and
   a finishing mill, comprising a reversing finishing stand immediately preceeding two tandem unidirectional six-high rolling stands with relatively small diameter work rolls, said finishing mill being disposed downstream to and at an exit side of said roughing mill, whereby said two six-high rolling stands provide for improved shape control.

2. A hot strip plant according to claim 1, wherein the distance between said roughing mill and said finishing mill provides that a material does not reach said finishing mill until a final pass through said roughing mill.

3. A hot strip plant according to claim 2, wherein a final pass of said roughing mill is carried out interlockingly with an initial pass of said finishing mill.

4. A hot strip plat according to claim 2, further comprising:
   a continuous casting plant;
   a hot rolling plant;
   a furnace having reheating and soaking functions, for coupling said continuous casting plant to said hot rolling plant; and
   a heat retaining box disposed adjacent to said furnace, for accumulating slabs.

* * * * *